March 26, 1957  H. B. SMITH  2,786,298
FLY TRAP
Filed Feb. 21, 1955  2 Sheets-Sheet 1

Hermon B. Smith
INVENTOR.

BY *Clarence A. O'Brien
and Harvey B. Jacobson*
Attorneys

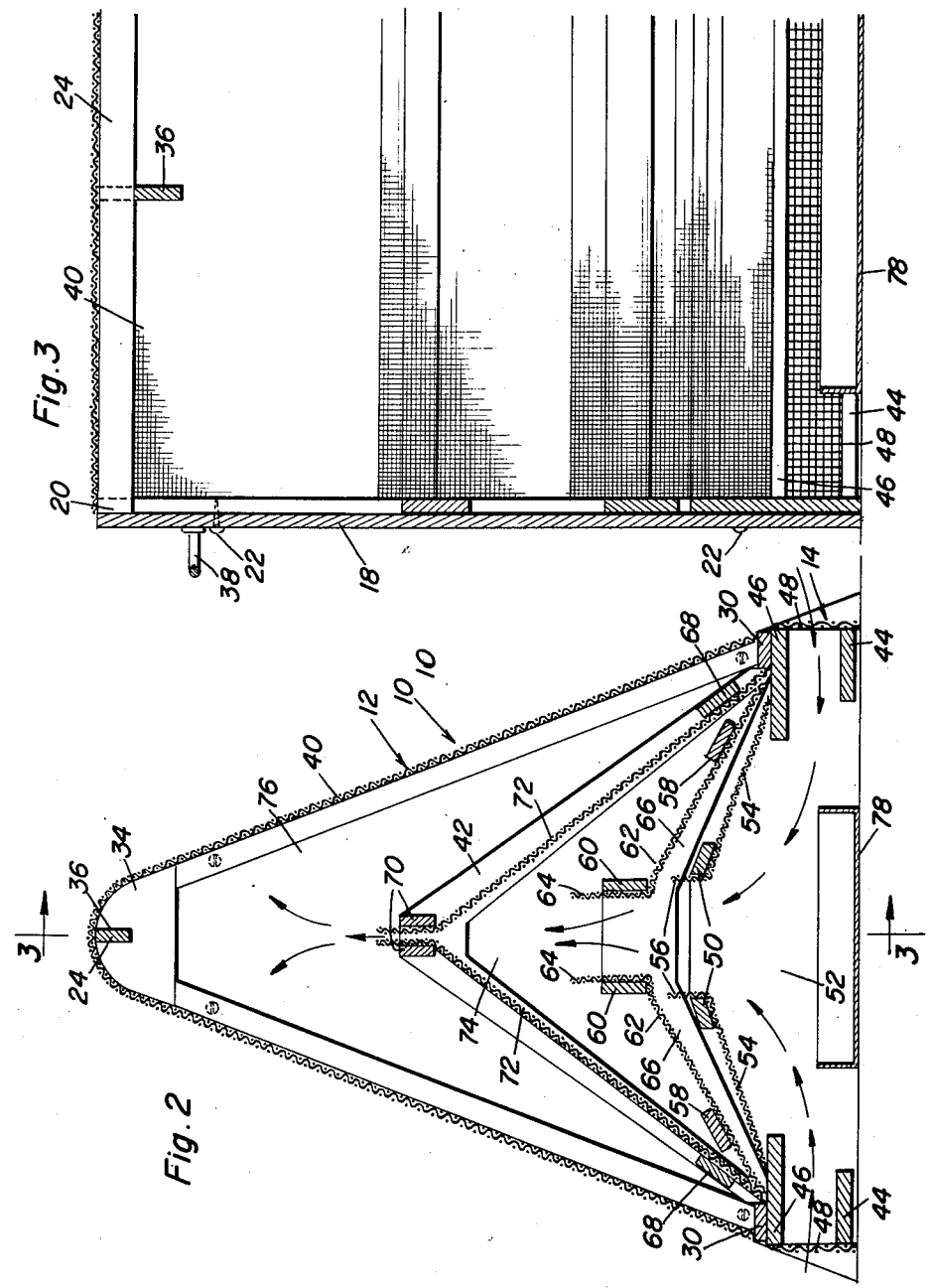

United States Patent Office 2,786,298
Patented Mar. 26, 1957

2,786,298

FLY TRAP

Hermon B. Smith, Tulsa, Okla., assignor of fifty percent to Robert E. Brooks, Tulsa, Okla.

Application February 21, 1955, Serial No. 489,668

3 Claims. (Cl. 43—118)

This invention relates generally to insect traps, and is more particularly directed to a novel fly trap which includes a plurality of fly trapping baffles which have progressively smaller openings for preventing the escape of flies therefrom.

An object of the invention in conformance with that set forth above is to provide in such a fly trap means for admitting the ingress of flies in such a trap through suitable openings while preventing the entrance of rodents.

And still another object of invention in conformance with those set forth above is to provide in such trap means for attracting the flies therein as well as providing a structure which is relatively sturdy and not susceptible to being overturned.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a transverse sectional view through a medial portion of the novel trap; and Figure 3 is a longitudinal sectional view of a portion of the novel trap taken substantially on line 3—3 of Figure 2.

Figure 1:
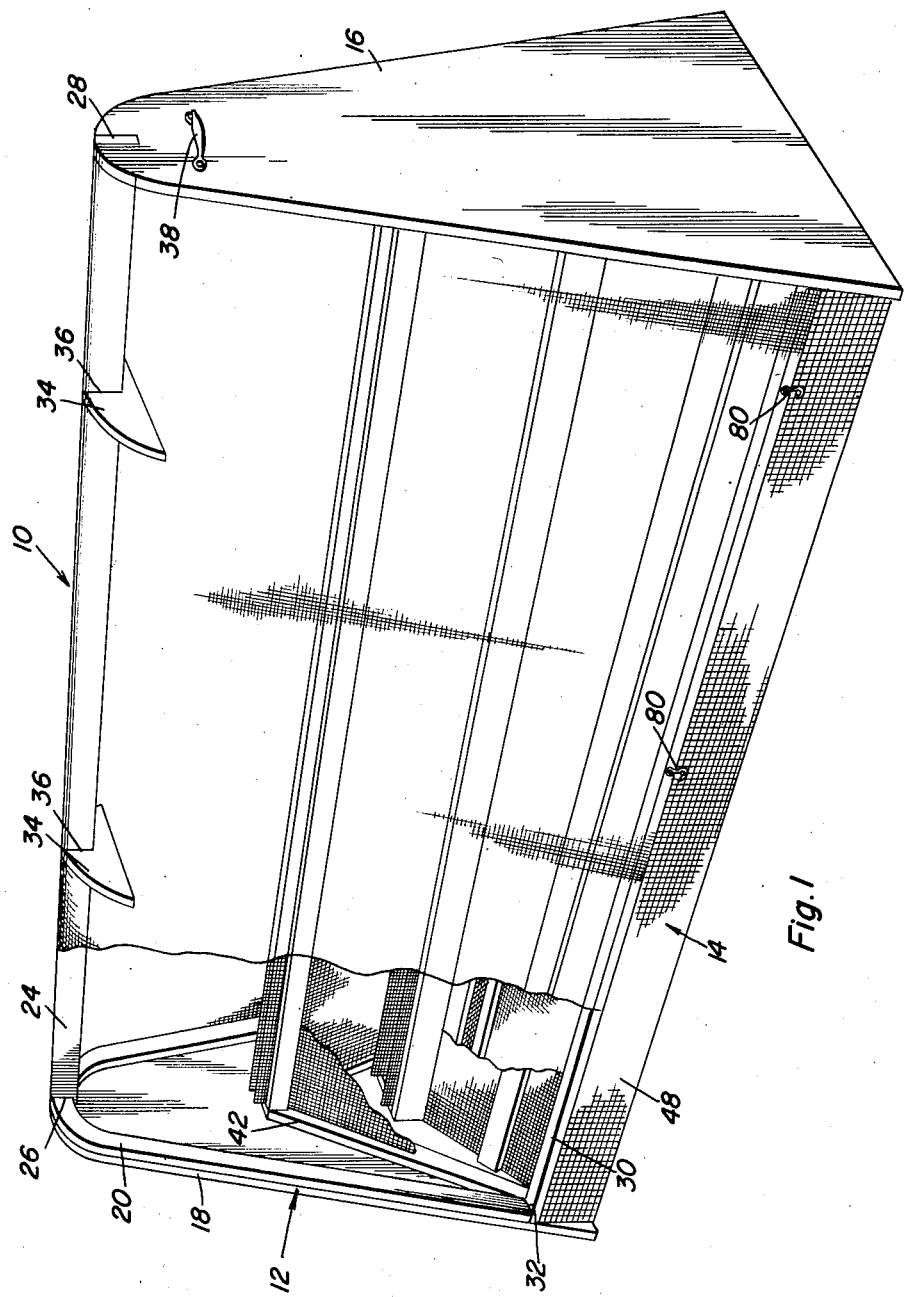
Figure 1 is a perspective view of the novel fly trap with portions broken away for clarity.

The novel fly trap is indicated generally at 10 and includes an outer frame portion 12 and a lower base portion 14.

The upper frame portion includes a pair of similar end members 16 and 18 which are of a substantially triangular shape terminating in a curved top, the end member 18 being secured to a U-shaped frame member 20 by means of fasteners 22, for example, for a purpose to be subsequently described. An upper transverse longitudinal brace 24 extends from members 20 and 16 in suitable notched portions 26 and 28, respectively, and a pair of lower parallel longitudinal side brace and support members 30 extend from the lower portion 32 of member 20 and are secured thereto to the inner side wall of the end member 16. Interposed along the upper longitudinal member 24 are a plurality of spacing and support members 34 which have a configuration similar to the end members and are secured thereto by means of a centrally notched portion 36 in any suitable manner. Secured on the outside of end portions 16 and 18 are suitable handles 38. Extending from the members 30 and extending over the top of member 24 is a screen or foraminous covering member 40 which is secured thereon in any suitable manner, the covering being of a size which prevents the passage therethrough of flies being retained in the trap. As seen in Figure 3, the end member 18 by virtue of the screws 22 is removably fastened to the frame 20, thus the end member 18 constitutes a false end wall which may be removed at various intervals for the removal of flies from the base member 14 after the same is tipped over by grasping the handle 38 at the opposite end of the fly trap.

The base member 14 includes a pair of triangular end members 42, which may be solid, if desired, only one of said end members 42 being shown, as seen in Figures 1 and 2 most clearly, and extending longitudinally between the end members 42 are lower base members 44 and upper base members 46 vertically spaced therefrom. The outer edge portions of each of the pairs of base members 44 and 46 have secured thereto a screened or foraminous wire cloth which has openings of approximately one-quarter of an inch size for permitting the ready entrance of flies therethrough but preventing the entrance of rodents or similar pests into the trap, said screen being indicated by reference character 48. A first pair of mutually parallel longitudinal members 50 are secured between the end members 42 in upward and inward relation to the members 46 for forming therewith an entrance compartment designated at 52. A wire screen cloth 54 extends from the members 46 around the members 50 and vertically upward having extending portions 56 which define an entrance to the second compartment to be subsequently described. Additional pairs of longitudinal members 58 and 60 extend from the end members 42, said longitudinal members 58 and 60 having secured thereto from the member 46 a foraminous wire cloth 62 having upwardly extending vertical portions 64 which define an additional entrance to another compartment within the base member, the screen portions 54 and 62 cooperating to define a fly holding portion 66. Additional pairs of longitudinal members 68 and 70 extend between the members 42 and also have the foraminous wire cloth 72 secured thereon, wherein the wire screen portions 62 and 72 define a chamber 74 for retaining flies therein, the members 70 defining an entrance portion into another chamber 76 defined by the foraminous cover 40 and the foraminous wire cloth portion 72.

The base member 14 is placed over a suitable bait tray 78 which may contain a food attractive to the flies, and may further contain a poison therein for killing the flies.

As indicated by the arrows extending from compartment 52 and up through the base member up through the compartment 76, the flies enter the screen 48 some of them being retained in chamber 66, others being retained in chamber 74 and still others being retained in chamber 76. The flies after dying due to beating themselves to death against the foraminous coverings, or from the poison contained in the bait tray will accumulate on the various ledges of the compartments and will be subsequently removed. As seen in Figure 1 suitable hook members 80 are provided between the periphery member 12 and base member 14 in any suitable manner. At suitable intervals the end member 18 may be removed and some of the dead flies which have accumulated on the base member 14 may be emptied or removed therefrom by either scraping or tilting the trap. At other times the hook members 80 may be utilized to remove the entire frame member 12 from the base member 14. It will be noted that the longitudinal members 30 are supported on the top portion of the longitudinal members 46 of the base member 14.

Thus it is readily apparent that there has been disclosed a fly trap which fully conforms to the objects of invention as heretofore set forth.

Various positional directional terms such as "front," "rear," and "side" are utilized herein to have only a relative connotation to aid in describing the device and are not intended to be interpreted as requiring any particular orientation with respect to any external elements.

The foregoing is considered as illustrative only of the principles of the invention. Further, since numerous modifications and changes will readily occur to those

What is claimed as new is as follows:

1. In a fly trap, the combination of a base including a pair of triangular end members, a pair of upper and a pair of lower longitudinally extending frame members secured to and extending between said end members near the lower corners thereof, a foraminous covering having an entrance and extending between one of said upper and one of said frame members on the same side of said base for permitting the ingress of flies and preventing the entrance therethrough of rodents, a frame member extending between the apices of said end members, a foraminous cloth extending from a frame member on one side of said base and over said member at said apices and to a frame member on the opposite side of said base to form the side walls of said trap, a first pair of spaced longitudinal members secured to said end members and spaced from said side walls and said base, a first foraminous cloth attached to each longitudinal member and one of said upper frame members with the space between said longitudinal members constituting a longitudinal fly opening, and a second pair of spaced longitudinal members secured to said end members, second foraminous cloths secured to said second pair of longitudinal members and extending to said walls, said longitudinal members with said first and second foraminous cloths defining a plurality of compartments each compartment including a longitudinal opening permitting the movement of flies therethrough, said second pair of spaced longitudinal members being vertically spaced above said first pair of longitudinal members and having its members closer together than the members of said first pair.

2. The fly trap of claim 1 wherein there is a third pair of longitudinal members extending between said end members and secured thereto, said third pair of longitudinal members being spaced a smaller distance than said first pair and said second pair of longitudinal members so that the fly entrance defined by said members of said third pair of longitudinal members is smaller than the other of said fly entrances, and foraminous cloths extending from said members of said third pair of members to said walls of the trap to form with said side walls of the trap and said second foraminous cloths additional fly compartments 3. The fly trap of claim 2 wherein one of said end members has a removable portion which opens into each of said compartments for the removal of flies therefrom.

References Cited in the file of this patent

UNITED STATES PATENTS

| | | |
|---|---|---|
| 1,065,241 | Guy | June 17, 1913 |
| 1,167,339 | Curry | Jan. 4, 1916 |
| 1,172,211 | Jacobs | Feb. 15, 1916 |
| 1,574,426 | Koll | Feb. 23, 1926 |